United States Patent [19]

Hill et al.

[11] Patent Number: 5,287,411
[45] Date of Patent: Feb. 15, 1994

[54] SYSTEM FOR DETECTING THE SIREN OF AN APPROACHING EMERGENCY VEHICLE

[76] Inventors: James L. Hill, 11207 N. 39th St.; John W. Sloan, 2541 E. Yucca, both of Phoenix, Ariz. 85028

[21] Appl. No.: 928,843

[22] Filed: Aug. 11, 1992

Related U.S. Application Data

[63] Continuation of Ser. No. 560,883, Jul. 27, 1990, abandoned.

[51] Int. Cl.⁵ .................................................. G10L 5/00
[52] U.S. Cl. ........................................ 381/36; 381/41; 395/2.4; 340/902; 340/907
[58] Field of Search .................... 340/902; 381/36, 41, 381/56, 46-50

[56] References Cited

U.S. PATENT DOCUMENTS

| | | | |
|---|---|---|---|
| 4,625,206 | 11/1986 | Jensen | 340/902 |
| 4,626,849 | 12/1986 | Sims | 340/902 |
| 4,785,474 | 11/1988 | Bernstein et al. | 340/902 |
| 4,806,931 | 2/1989 | Nelson | 340/902 |
| 4,956,866 | 9/1990 | Bernstein et al. | 340/907 X |

Primary Examiner—Robert L. Richardson
Assistant Examiner—Kee M. Tung
Attorney, Agent, or Firm—Tod R. Nissle

[57] ABSTRACT

A siren detection system controls the lights at an intersection to direct traffic and permit an emergency vehicle to travel through the intersection unimpeded. The system determines the frequency of the sound emanating from a siren carried by the emergency vehicle by counting pulses that indicate the frequency of the sound, by determining the elapsed time necessary to count a selected number of pulses, and by utilizing the elapsed time and number of pulses counted to determine the frequency of sound emitted by the siren.

1 Claim, 4 Drawing Sheets

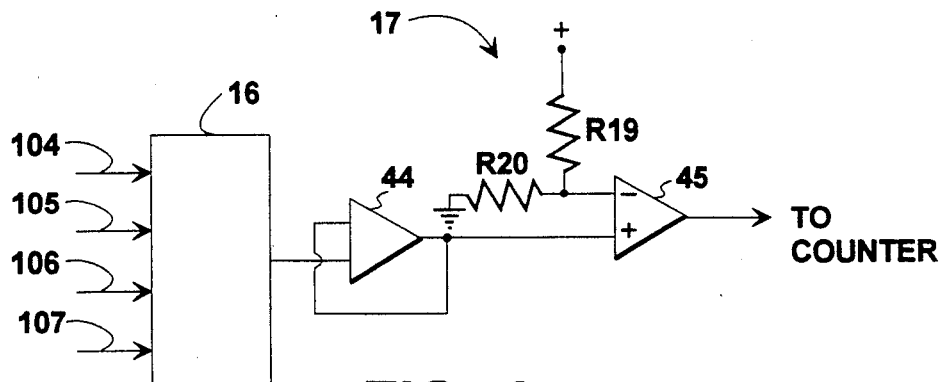
FIG. 4
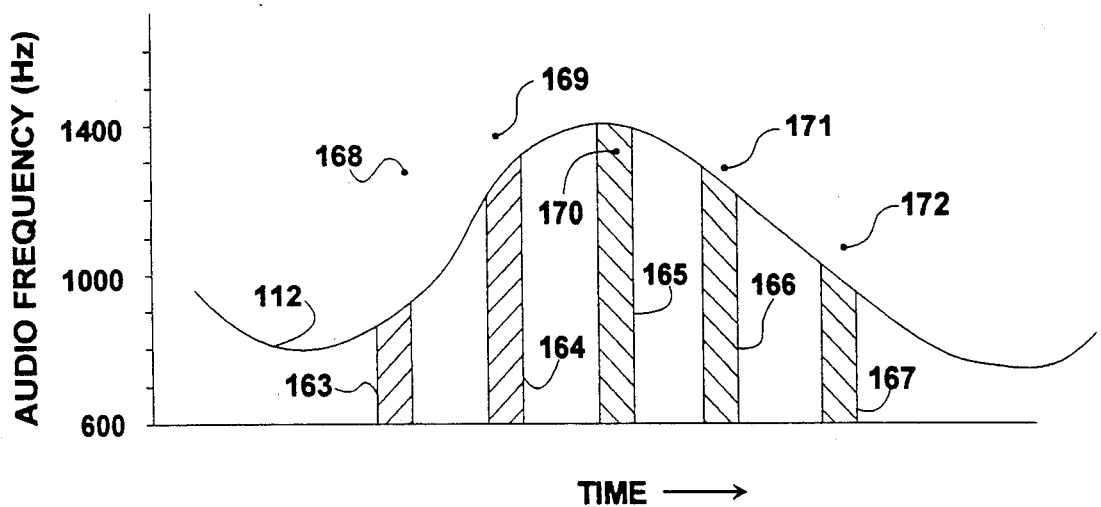
FIG. 5
FIG. 6
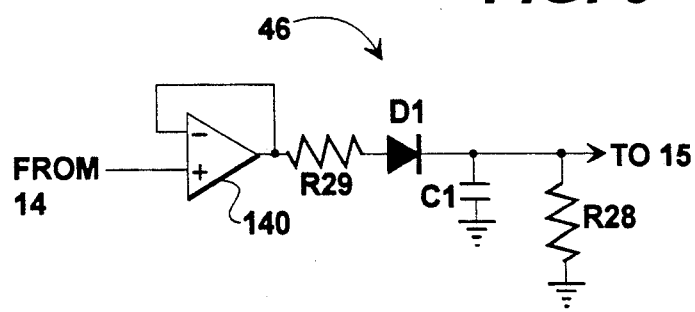

SYSTEM FOR DETECTING THE SIREN OF AN APPROACHING EMERGENCY VEHICLE

This is a continuation of application Ser. No. 07/560,883, filed Jul. 27, 1990, now abandoned.

BACKGROUND OF THE INVENTION

1. Field of the Invention

This invention relates to sound detection systems.

More particularly, the invention relates to a system for detecting the siren of an approaching emergency vehicle and for controlling the traffic lights at an intersection to facilitate passage of the vehicle through the intersection in a desired direction.

In a further respect, the invention relates to a siren detection system which accurately determines the frequency of sound from a siren by counting pulses that indicate the frequency of the sound, by determining the elapsed time necessary to count a selected number of pulses, and by utilizing the elapsed time and number of pulses counted to determine the frequency of sound emitted by the siren.

In another respect, the invention relates to a siren detection system which identifies the presence of a siren by taking a sequential series of samples of sound frequencies being emitted by the siren and by determining whether the series of samples includes a selected number of sequential frequency samples having rising values and includes a selected number of sequential frequency samples having falling values, the specific value of each frequency sample being irrelevant as long as each value falls within a broad frequency band occupied by sound frequencies produced by conventional sirens.

In still a further respect, the invention relates to a siren detection system which can be adjusted to be activated when an approaching siren is at one of a selected number of different distances from the detection system.

In yet another respect, the invention relates to a siren detection system in which the volume of sound from an approaching siren is determined by averaging the amplitude of each of a selected sequential series measured frequency values which represent the sound produced by the siren.

2. Description of the Related Art

Systems for detecting the siren of an approaching emergency vehicle are well known in the art. See for example, U. S. Patent Nos. 4,759,069 to Bernstein et al., 4,625,206 to Jensen, and 4,806,931 to Nelson. The Bernstein et al. patent provides a useful summary of prior art systems. The system described in the Jensen patent, require the sequential or cascading detection of specific signal frequencies. The system in Bernstein et al., identifies a siren by using a bank of stepped, narrow band frequency filters to detect a series of frequencies each in a specific range. This predisposition toward premising the detection of a siren on the identification of a series of specific frequencies appears central to the prior art. In the Nelson patent, a series of frequency samples is fit to a specific algorithm which defines the sound pattern of the siren detected by the system.

In practice, attempting to identify and correspond a sequential series of sound frequency sample values to a specific selected series of reference frequency values appears difficult to do, probably because of the presence of buildings and of other surfaces which reflect sound, of systems to accurately extraneous noise, and of other unknown factors which affect the ability of prior art systems to accurately detect specific sound frequencies. In particular, attempting to make the system described in U. S. Pat. No. 4,806,931 to Nelson function is not readily accomplished. Obtaining a sequential series of sound frequency sample values and fitting the values to a reference algorithm or curve in the manner illustrated in FIGS. 3A to 3C of the Nelson patent was found difficult.

Also central to the prior art is the determination of the frequency of sound from a siren by counting direct current pulses derived from sound received from the siren. The number of pulses counted during a set sampling period of time is, as is well known in the art, used to determine the frequency of the sound. The drawback to such counting techniques is that only "complete" pulses are counted during the set sampling period of time. Once the sampling period of time expires, counting stops. When a relatively small number of pulses is detected and counted during a sampling period, a large error in counting can occur. If, for example, three pulses are counted during a sampling period, it is possible that a fourth pulse was about to be counted at the instant the sampling period terminated. The failure to count this fourth pulse would introduce an error of about 25% into the count samples Accordingly, it would be highly desirable to provide an improved siren detection system which would count with improved accuracy the number of pulses derived from sound emitted by a siren and which would, without requiring the fitting of a group of sequential frequency sound sample values to a specific sequential series of reference values, permit the presence of a siren to be determined from the group of sample values.

Therefore, it is a principal object of the invention to provide an improved sound detection system.

A further object of the invention is to provide an improved system to detect an approaching emergency vehicle siren, to identify the direction of approach of the emergency vehicle, and to control the traffic lights at an intersection to facilitate passage of the emergency vehicle through the intersection.

Another object of the instant invention is to provide an improved siren detection system which can identify the presence of a siren from a sequential series of sound frequency sample values without requiring that the sound frequency sample values fit a selected series of specific reference values.

Still a further object of the invention is to provide an improved siren detection system which more accurately counts the number of direct current pulses derived from siren sound received by the detection system.

BRIEF DESCRIPTION OF THE DRAWINGS

These and other, further and more specific objects and advantages of the invention will be apparent to those skilled in the art from the following detailed description thereof, taken in conjunction with the drawings, in which:

FIG. 4 is a circuit diagram illustrating further details of the sound detection system of FIG. 1;

FIG. 5 is a graph illustrating how the system of the invention periodically samples a siren sound frequency pattern and compares the samples to a rise and fall reference frequency pattern;

FIG. 6 is a circuit diagram illustrating additional details of the sound detection system of FIG. 1; and, FIG. 7 is a block diagram which illustrates a typical program or logic function in accordance with the presently preferred embodiment of the invention.

SUMMARY OF THE INVENTION

Briefly, in accordance with my invention, I provide an improved system for detecting the presence of sound signals varying in frequency in a predetermined manner over a predetermined spectrum and for determining the direction from which the sound signals are emanating, the variation in audio frequency defining a sound pattern. The system includes in combination, signal selection means having a plurality of inputs and including apparatus to selectively at any given time produce an output signal derived from only one of the signals received by the inputs of the selection apparatus; a plurality of directional sound pickup apparatus each connected to one of the signal selection inputs and each facing in a different selected direction to produce input signals representative of the volume and frequency of the sound signals; first counting apparatus responsive to the output of the signal selection apparatus to detect, by counting a selected number of counts, a sound signal having a selected frequency within the predetermined audio frequency spectrum of the sound signals and to produce an output signal in response to such detection and recognition of said sound signal having said frequency, the output signal indicating the time elapsed at the moment the selected number of counts is counted; second counting apparatus responsive to the output signal of the first counting apparatus to periodically sample during a selected number of time periods said output of the signal selection apparatus to determine the frequency of the sound signal received by the sound pickup apparatus to produce the output of the signal selection apparatus; apparatus for storing the frequency sample; sound pattern recognition apparatus for recalling the plurality of frequency samples and comparing the samples to a selected reference sound pattern comprised of a selected number of successively increasing frequency sample values followed by a selected number of successively decreasing frequency sample values, the sound pattern recognition apparatus determining when the frequency samples correspond to the reference sound pattern, and for producing an output signal on correspondence of the frequency samples to the selected sound pattern; and, apparatus connected to the sound pickup means and responsive to the output signal of the sound pattern recognition devices for comparing the volume of the sound signals received by the sound pickup devices to produce each of the input signals, and for generating an output signal representative of the one of the input signals having the greatest volume.

DESCRIPTION OF THE PREFERRED EMBODIMENTS

Figure 1:
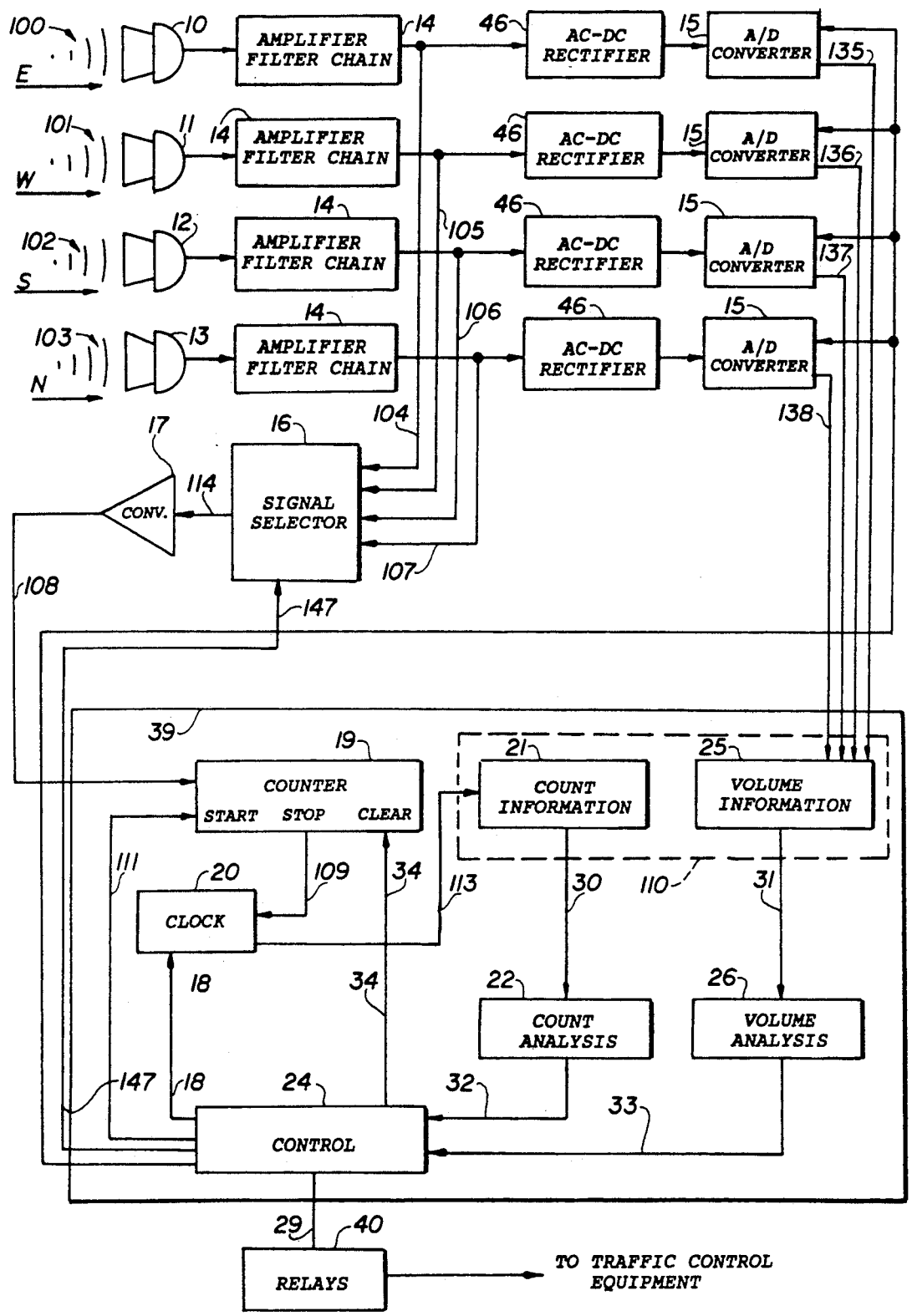
FIG. 1 is a block diagram illustrating a sound detection system constructed in accordance with the principles of the present invention.
Figure 2:
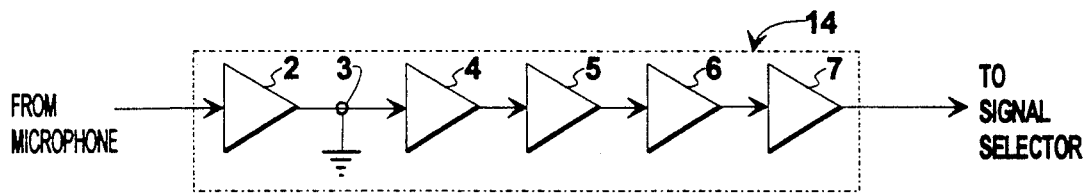
FIG. 2 is a block diagram illustrating the amplifier—filter chain components of the system of FIG. 1.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 is a block diagram of a sound detection system constructed in accordance with the principles of the invention. In FIG. 1, directional microphones 10 to 13 each face in a selected different direction with respect to the remaining directional microphones. Microphone 10 faces to the west and best receives sound signals 100 traveling in the direction of arrow E toward the east. Microphone 11 faces to the east and best receives sound signals 101 traveling in the direction of arrow W toward the west. Microphone 12 faces the north and best receives sound signals 102 traveling in the direction of arrow S to the south. Microphone 13 faces the south and best receives sound signals 103 traveling in the direction of arrow N to the north. Sound signals 100 to 103 received by microphones 10 to 13 are converted to electronic signals which are processed by the amplifier—filter chain 14 illustrated in FIG. 2. In FIG. 2, electronic signals from a microphone are received and amplified by the pre-amplifier 2. The output signal from the pre-amplifier 2 is supplied to the input of the amplifier 4 by means of a shielded cable 3.

In actual field installation, the wire connection between a microphone 10 to 13 and subsequent circuits may be several hundred feet in length. This requires the use of shielded cable, as well as a suitable pre-amplifier that is located at or near the microphone to overcome the adverse effects of induced noise or spurious signals.

In FIG. 2, the electrical signal from preamplifier amplifier 2 is further amplified by the amplifier 4, the output of which is passed through a pair of symmetrical amplifiers 5 and 6 to cut out extraneous noise and prevent overloading at the input of the following amplifier 7. Amplifier 5 is a low pass filter and amplifier 6 is a high pass filter. Such overloading, if it were to occur, would cause distortion and the generation of undesirable harmonic energy. Amplifier 5 has a built-in low-frequency roll-off characteristic with a cutoff frequency of approximately 600 Hz. Amplifier 6 has a built in high frequency roll-off characteristic at 1600 Hz. Thus, electrical signals outside the frequency band of interest are eliminated at this point, reducing a potential source of false triggering or improper operation of subsequent circuits due to spurious signals or harmonic distortion.

Sirens used by emergency vehicles such as police cars, ambulances, and fire trucks generally produce a sinusoidal signal, the pitch or frequency of which and the intensity of which varies with time. Actual sirens currently in use in the United States and other countries of the world have a frequency range between 600 Hz and 1200 Hz. The sirens cover this range at a rate of approximately 15 cycles per minute (for a "wail") and 240 cycles per minutes (for a "yelp"). These characteristics are generally universal, although the siren operator can usually, if he wishes, vary the cycles per minute of the siren.

The output 104 to 107 of each amplifier—filter chain 14, respectively is directed both to an AC-DC rectifier 46 and to a signal selector 16. Selector 16 accepts at any given time one of the signals 104 to 107 from the outputs of the four amplifier-filter chains 14 to produce a single output signal to the converter 17. Converter 17 "digitizes" or converts the AC analog sine wave signal to a positive voltage only signal with fast rise and fall times.

This digitized signal becomes the signal train frequency source input 108 to the counter 19 in controller 39.

Each AC-DC rectifier 46 functions to produce a compressed sine wave which represents the average of the upper or "positive" portions of the sine wave received by the rectifier 46. The circuitry in each rectifier 46 is illustrated in FIG. 6 and includes buffer amplifier 140, diode D1, capacitor C1, and resistors R28 and R29.

In FIG. 1, the outputs of the AC rectifiers 46 are each received by an analog to digital converter 15 and outputs 135 to 138 from the analog to digital converters 15 are directed to the volume information 25 portion of the memory of controller 39.

As noted, converter 17 (as do converters 15) converts the AC analog sine wave into a direct current format. Consequently, whenever a "positive" input signal 114 from selector 16 is directed to converter 17, the output of the converter 17 is a positive voltage of a predetermined amount, and when a "positive" input signal 114 is not present, the output of converter 17 is zero volts or ground, representing respectively digital "1" or "0" signals In the sinusoidal signal 114 from selector 16, the upper part of the wave is "positive" and the lower part of the wave is "negative" Accordingly, the stream of "1" signals produced by converter 17 corresponds to the frequency of signal 114.

By way of example, in FIG. 1, clock 20 is loaded with a twenty millisecond time-out. Counter 19 is cleared 34 by control 24 and set equal to zero counts. Control 24 simultaneously enables (starts) 18, 111 clock 20 and counter 19. After counter 19 detects a predetermined number of counts, counter 19 immediately stops 109 clock 20. The elapsed time on clock 20 is transmitted 113 to count information 21 in the memory 110 of controller 39. Count analysis logic 22 utilizes the elapsed time and number of counts to determine the frequency of signal 114 and to determine if the frequency is within desired limits. For example, in the case of a siren signal, the frequency is in the range of 600 Hz to 1600 Hz. This means that during a 10 millisecond sample period, the "start" range utilized is typically 600 to 1600 Hz. If four counts is the predetermined number of counts selected for counter 19, then the counter 19 should detect four counts in about 6.67 to 2.5 milliseconds to then the correspond to the "start" range of 600 to 1600 Hz, i.e., counter 19 should take no longer than 6.67 milliseconds to receive four counts. If counter 19 takes longer than 6.67 milliseconds, then control 24 commands 147 selector 16 to switch from one signal 104 to 107 to the next successive signal (i.e., from 104 to 105, from 105 to 106, etc.) and again loads clock 20 within a twenty millisecond time-out, clears 34 counter 19, and simultaneously enables (starts) 18, 111 clock 20 and counter 19 to initiate the twenty millisecond sample period. If, on the other hand, four counts is detected by counter 19 in less than 6.67 milliseconds but more than 2.5 milliseconds, control 24 directs counter 19 to take a selected number of sequential count samples during a selected number of equally spaced twenty millisecond time periods to define the sound pattern comprising the signal 104 to 107. If during any one of these sound pattern recognition count samples four counts are detected in less than 2.5 milliseconds and more than 6.67 milliseconds, then the sound pattern recognition count sampling is aborted, and the control 24 directs counter 19 to again begin taking twenty millisecond "start" samples to locate a "start" frequency in the range of 600 Hz to 1600 Hz.

If the counter 19 detects four counts in 1.5 milliseconds or less, then the frequency of the sound detected by the system is greater than 1600 Hz and is outside the desired 600 Hz to 1600 Hz siren frequency range.

If counter 19 has not detected four counts by the end of the twenty milliseconds time-out or sample period, then control 24 loads clock with a new twenty millisecond time-out, clears 34 counter 19, commands 147 selected 16 to switch to the next successive signal 104 to 107, and simultaneously enables 18, 111 clock 20 and counter 19 to initiate the new twenty millisecond sample period.

During the taking of a series of sound pattern recognition count samples for a particular signal 104 to 107, control 24 operates counter 19 and clock 20 in a manner similar to their operation during the obtaining of ten millisecond "start" samples. For example, clock 20 is loaded 18 with a twenty millisecond time-out. Counter 19 is cleared 34 by control 24 and set equal to zero counts. Control 24 simultaneously enables (starts) 18, 111 clock 20 and counter 19. After counter 19 detects four counts, clock 20 is stopped and the elapsed time is sent 113 to count information 21. The elapsed time, is compared by count analysis logic 22 to predetermined upper and lower sampling times. Since the frequency of siren signals is ordinarily between 600 Hz and 1600 Hz, such predetermined upper and lower sampling times typically are, as noted, equivalent to 6.67 and 2.5 milliseconds, respectively. When the elapsed time during a twenty millisecond sound recognition pattern count sample period is within this range, control 24 reactivates counter 19 and clock 20 in the manner described above to obtain another twenty millisecond sound pattern recognition sample. Each successive twenty millisecond sample period presently preferably begins exactly twenty milliseconds after the preceding sample period began. Consequently if in the proceeding sample period four counts were detected in four milliseconds and the clock 20 was stopped, then another 16 milliseconds passes before clock 20 is reactivated to begin the next 20 millisecond sampling period. If the count determined during a twenty millisecond pattern recognition sample period is outside the desired range, then the sound recognition sample is aborted and the control 24 directs counter 19 to begin again taking twenty millisecond period samples to search for a "start" frequency in the range of 600 Hz to 1600 Hz.

Assuming that the twenty millisecond sound pattern recognition count sampling proceeds without the detection by counter 19 of four counts in a length of time outside the desired range, then a successive series of samples is taken for a signal 104 to 107 until a desired number of ten millisecond sound pattern recognition count samples is taken. The number of ten millisecond sound pattern recognition samples taken can vary as desired, but ordinarily falls in the range of four to ten. For the sake of this example, it is assumed five samples are taken.

Once five sound recognition samples are taken for one signal 104 to 107, and identical number of samples is taken for each of the other remaining signals 104 to 107. When sound recognition samples are taken for each of the other remaining signals 104 to 107, the full number of samples is taken for each remaining signal 104 to 107 even if the elapsed time for one of the samples falls outside the desired 2.5 millisecond to 6.7 millisecond range. The samples for each signal 104 to 107 are compared to a selected reference sound frequency pattern which falls in the selected audio frequency band spectrum. As earlier noted, the audio frequency band spectrum for sirens is normally 600 Hz to 1600 Hz.

An important aspect of the invention is that the reference sound pattern utilized int he invention is not comprised of a series of specific desired reference frequencies. U.S. Pat. No. 4,806,931 and other prior art systems attempt to fit a series of measured sound sample frequency values to a series of selected fixed reference values. In the frequency pattern utilized in the invention, a series of measured sample frequency values is analyzed to determine if there are two or more rising frequency sample values followed by two or more falling frequency sample values. The number of rising and/or falling frequency sample values required for the sample values to "fit" the sound pattern can be varied as desired. Assuming, for sake of example, that it was desired to identify a reference sound pattern comprised of a sequential series of sound frequency sample values in which two sequential samples provided an increase in frequency and three immediately subsequent sequential values provided a decrease in frequency values, then the following sequences of frequency sample values would each "read" on the desired reference sound pattern; (a) 600 Hz, 650 Hz, 649 Hz, 648 Hz, 647 Hz; (b) 650 Hz, 700 Hz, 1400 Hz, 1300 Hz, 700 Hz, 690 Hz, 680 Hz, 681 Hz, 678 Hz, 690 Hz (in this group of samples, ten readings were taken, but the ten readings include a series of five sequential readings in which the first two readings—700 Hz and 1400 Hz—provide an increase in frequency value and the next three subsequent sequential readings provide a decrease in frequency values. Consequently, the samples "fit" the desired sound pattern); (c) 1300 Hz, 1400 Hz, 900 Hz, 800 Hz, 700 Hz. In FIG. 5, sinusoidal curve 112 represents the reference sound pattern for a siren. Points 168 to 172 indicate the five sound pattern count samples, each of which has been altered from its original elapsed time format to its corresponding cycles or counts per second to be plotted on the graph of FIG. 5. Also in FIG. 5, shaded areas 163 to 167 indicate the selected sample time periods during which counter 19 was operated to obtain each sample 168 to 172. Sample 168 was obtained during the twenty millisecond sample period 63, sample 16 was obtained during the twenty millisecond sample period 164, sample 170 was obtained during the twenty millisecond sample period 165, etc. Note that the time intervals between successive count sample periods are typically equal to one another. In FIG. 5, these time intervals have a value greater than zero. In the presently preferred embodiment of the invention, these time intervals are, however, equal to zero. Samples 168 and 169 represent rising frequency values. Samples 170 to 172 represent falling frequency values. Samples 168 to 172 do not "fit" curve 112 but do fit the rising—falling sound pattern utilized in this example.

Once count analysis 22 receives for each signal 104 to 107 the selected number of sequential sound recognition samples, analysis 22 determines which signals 104 to 107 include samples that produce the desired rise and fall sound pattern. Control 24 evaluates data produced by volume analysis 26 for each signal 104 to 107 having a group of samples which fits the desired sound pattern.

Each time a frequency sample is taken for a particular signal 104 to 107, the amplitude of the sample is measured and forwarded 135 to 138 to volume information 25 in memory 110. Volume analysis 26 averages the amplitude or volume values obtained for each of the five samples taken for each signal and transmits 33 the average volume value to control 24. Control 24 compares the average volume for each signal 104 to 107 which produced a group of sound frequency samples having the desired rise and fall sound pattern. The direction of travel of the siren is identified by the signal having a group of frequency samples which produce the requisite rise and fall sound pattern and which provide the greatest average volume. If sound waves 100 have the greatest volume, then the emergency vehicle is, assuming microphones 10 to 13 are located at the center of the intersection of an eastwest street and a north-south street, traveling from the west toward the intersection. In the preferred embodiment of the invention, the light the emergency vehicle is traveling toward is turned green, while the remaining lights at the intersection are turned red. This is accomplished in well known fashion when control 24 either sends appropriate signals 29 to relays 40 controlling the traffic lights at the intersection, or sends appropriate binary data signals to the lamp controller according to the NEMA safety standards promulgated by the U.S. Government.

Figure 3A:
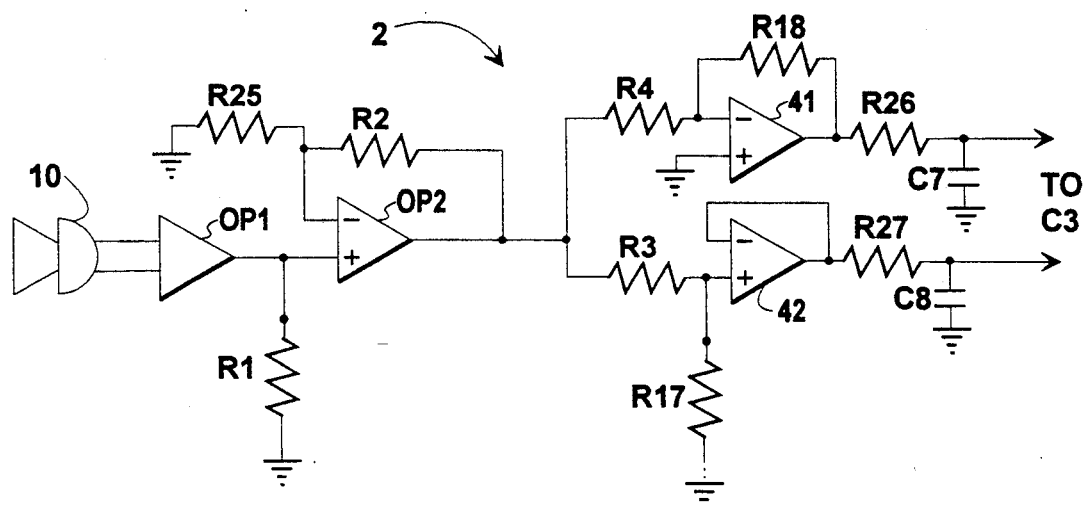
FIG. 3A is a circuit diagram illustrating details of the sound detection system of FIG. 1.

The pre-amplifier 2 shown in FIG. 3A is designed to be remotely located at or near the microphone and is connected to the amplifier 4 by means of shielded cable 3. The circuit configuration of the pre-amplifier 2 in its connection to amplifier 4 requires a multi-conductor wire plus a shield. The signal from microphone 10 is received by op-amps OP1 and OP2 and passes through amplifiers 41 and 42. Amplifier 41 produces an inverted signal. Amplifier 42 produces a non-inverted signal which is transmitted 43 to capacitor C3 in FIG. 3B. The other components of pre-amplifier 2 include resistors R1, R2, R3, R4, R17, R18, R25, R26, R27 and capacitors C7 and C8.

Figure 3B:
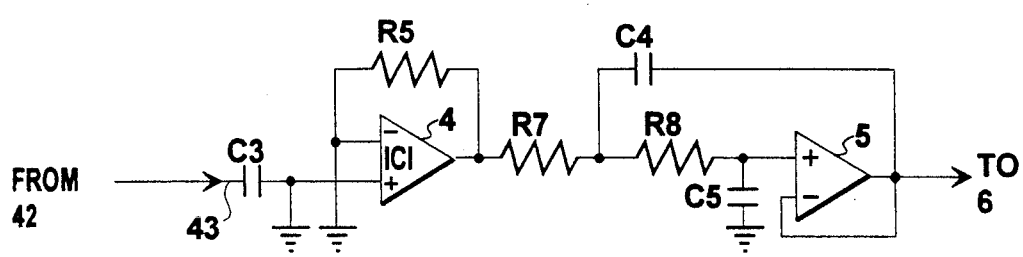
FIG. 3B is a circuit diagram illustrating details of the sound detection system of FIG. 1.

In FIG. 3B, amplifier 4 is an integrated circuit operational amplifier, ICI, connected in a non-inverting, high-grain configuration. In the interest of simplicity, supply voltage terminals are not shown. Resistor R5 provides a signal feedback path of the inverting input, resistor R8 and capacitor C4 control the roll-off characteristic by establishing the low-frequency cutoff frequency of the amplifier, and resistor R7 provides load isolation between amplifier 4 and low pass filter 5. Amplifier 7 is similar to amplifier 4.

The circuit for converter 17 is illustrated in more detail in FIG. 4 and includes buffer amplifier 44 and amplifier 45 which converts the AC analog sinusoidal signal into a "square wave" format. Converter 17 also includes resistors R19 and R20.

Figure 7:
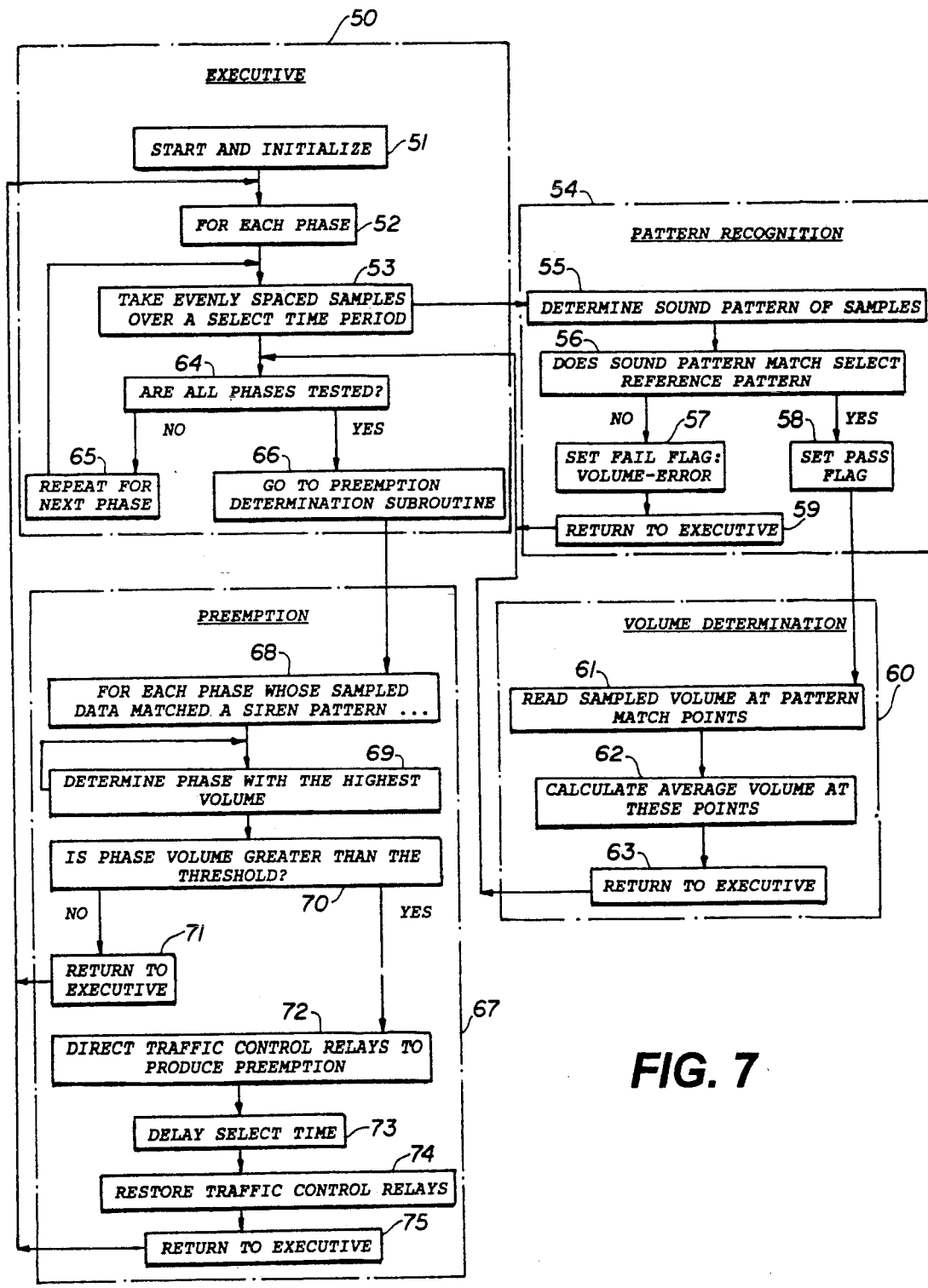

FIG. 7 is a block flow diagram which illustrates a typical program or logic function which is executed by the controller 39 during operation of the sound detection system of FIG. 1. In FIG. 7, the word "phase" is used to indicate a signal 104 to 107. The basic control or executive program 50 consists of commands to "start and initialize" 51, to sequentially test "for each phase" 52 the frequency of the signal received to identify when a frequency is received in the broad band siren frequency range of 600 Hz to 1600 Hz, and, to "take evenly spaced samples over a selected time period" 53 for a phase once a frequency in the siren frequency range is detected. The "take samples" command 53 is followed by "are all phases tested" 64. If all phases or signals 104 to 107 are not tested 65, then samples are taken 64 for the untested phases or signals 104 to 107. If a sequence of sound frequency samples has been taken 64 for each phase the "go to preemption determination subroutine" command 66 transfers control to subroutine 67.

In the preemption subroutine 67, memory is interpreted to determine each phase whose samples reflected the desired rise—fall sound pattern 68, followed by the command 69 to "determine phase with the highest volume". After command 69, the command "is phase volume greater than the threshold" 70 determines whether the highest volume identified during command 69 exceeds a threshold volume. The command "return to executive" 71 returns control to the executive program to again begin sequentially sampling each phase or signal 104 to 107 until a frequency in the range of 600 Hz to 1600 Hz is identified. If the volume identified during command 69 is greater than the threshold volume the command "direct traffic control relays to produce preemption" 72 causes all lights in an intersection to display red except for the light facing the direction of approach by a vehicle carrying the siren detected by the system of the invention. The threshold volume indicates the volume expected to be detected when an emergency vehicle is a selected distance from microphone 10 to 13, i.e., when the microphone is a selected distance from the intersection. The command "delay select time" 73 causes the lights in the intersection to be preempted for a selected period of time to permit passage of the emergency vehicle, followed by the command "restore traffic control relays" 74 which causes the traffic control signals at the intersection to return to their normal sequence of operation. The command "return to executive" 75 causes a return to the basic control or executive program 50.

Each time "evenly spaced samples" are taken 53 for a particular phase, the pattern recognition subroutine 54 is initiated. In the pattern recognition subroutine 54, the command "determine sound pattern of samples" 55 causes the count analysis 22 to determine the frequencies indicated by the elapsed time data for each sequential sample stored in count information 21 for a signal 104 to 107. The pattern. indicated by the sequence of sample frequencies is then compared to a selected rise/fall sound pattern in accordance with command 56. This comparison determines whether the group of samples reflects the desired rise/fall sound pattern. If the samples reflect the desired sound pattern, the "set pass flag" command 58 causes control to be transferred to the volume determination subroutine 60. If the sequential group of samples for the phase does not reflect the desired sound pattern, then the "set fail flag" 57 command is followed by the command "return to executive" 59 which causes a return to the basic executive program 50.

In the volume determination subroutine 60, the command "read sampled volume at pattern match points" 61 causes volume analysis 26 to call up from volume information 25 the volume or amplitude measured each time a frequency sample was taken for a phase or signal 104 to 107. The command "calculate average volume at these points" 62 causes volume analysis 26 to average the amplitude values obtained for the frequency samples for the phase. The command "return to executive" causes a return to the basic control program 50.

The memory 110 can be any suitable art memory unit such as are commonly used in sound detection apparatus. For example, electromagnetic memories such as magnetic, optical, solid state, etc. or mechanical memories such as paper tape. In the case of solid state electromagnetic memories, such memories can be found incorporated in chips such as the Intel MCS51 family of chips, including the 8052 chip. The 8052 also provides a clock 20, counter 19, microprocessor.

Having described my invention in such terms as to enable those skilled in the art to understand and practise it, and having identified the presently preferred embodiments thereof, I claim:

1. A system for detecting the presence of sound signals varying in frequency in a predetermined manner over a predetermined spectrum and for determining the direction from which said sound signal are emanating, said variation in audio frequency defining a sound pattern, said system including in combination (a) a plurality of directional sound pickup means each connected to a sound selection input and each facing in a different selected direction to produce input signals representative of the volume and frequency of said sound signals;

(b) signal selection means for monitoring said sound selection inputs and for at any given time producing digital output signals derived from only one of said sound selection inputs and consisting of a stream of counts;

(c) first counting means responsive to said digital output signals to
  (i) detect sound frequencies by continuously repeatedly taking time samples which indicate the time required for said first counting means to receive a pre-selected number of the counts in said digital output signals, and
  (ii) produce frequency output signals representing the time measured during each of said time samples,
  said time measured during each of said time samples indicating the time elapsed from initiation of counting until the instant the required number of counts is received by said first counting means;

(d) second counting means responsive to said frequency output signals of said first counting means to obtain at least four (4) successive frequency samples;

(e) means for storing said successive frequency samples;

(f) random pattern recognition means for recalling said successive frequency samples and, when said samples include at least two successive increasing samples each having a frequency randomly falling in said predetermined audio spectrum followed by at least two decreasing frequency samples each having a frequency randomly falling in said predetermined audio spectrum, for producing a pattern recognition output signal, said random sound pattern recognition means producing said pattern recognition output signal without requiring that said successive frequency samples
  (i) correspond to and fit a pre-selected series of specific reference values defining a specific pre-selected sound pattern,
  (ii) each fit within one of a pre-selected stepped series of specific frequency bands within said predetermined audio spectrum,
  (iii) correspond to a pre-selected sequence of frequencies each lying within a pre-selected stepped series of specific frequency bands within said predetermined audio spectrum.

* * * * *